(12) United States Patent
Dana et al.

(10) Patent No.: US 7,699,236 B2
(45) Date of Patent: Apr. 20, 2010

(54) METHOD AND APPARATUS FOR MAKING AND DETECTING A DOCUMENT VERIFICATION INDICATOR USING OPTICAL PATTERN ENCRYPTION

(75) Inventors: Kristin Dana, Staten Island, NY (US); Gabriela Livescu, Marlboro, NJ (US); Yicheng Lu, East Brunswick, NJ (US)

(73) Assignee: Rutgers the State University, New Brunswick, NJ (US)

( * ) Notice: Subject to any disclaimer, the term of this patent is extended or adjusted under 35 U.S.C. 154(b) by 1308 days.

(21) Appl. No.: 11/111,639

(22) Filed: Apr. 21, 2005

(65) Prior Publication Data

US 2005/0246542 A1    Nov. 3, 2005

Related U.S. Application Data

(60) Provisional application No. 60/565,818, filed on Apr. 28, 2004.

(51) Int. Cl.
    *G06K 19/06* (2006.01)
(52) U.S. Cl. .................. 235/494; 235/454; 235/455
(58) Field of Classification Search .......... 235/494, 235/454, 455, 491
    See application file for complete search history.

(56) References Cited

U.S. PATENT DOCUMENTS

| | | | |
|---|---|---|---|
| 4,285,597 A | 8/1981 | Lamprecht et al. | |
| 4,344,709 A | 8/1982 | Provder et al. | |
| 4,360,275 A | 11/1982 | Louderback | |
| 4,806,018 A | 2/1989 | Falk | |
| 4,815,858 A | 3/1989 | Snail | |
| 4,988,205 A | 1/1991 | Snail | |
| 5,155,558 A | 10/1992 | Tannenbaum et al. | |
| 5,196,906 A | 3/1993 | Stover et al. | |
| 5,241,369 A | 8/1993 | McNeil et al. | |
| 5,270,794 A | 12/1993 | Tsuji et al. | |
| 5,371,582 A | 12/1994 | Toba et al. | |
| 5,541,413 A | 7/1996 | Pearson et al. | |
| 5,636,633 A | 6/1997 | Messerschmidt et al. | |
| 5,637,873 A | 6/1997 | Davis et al. | |
| 5,703,692 A | 12/1997 | McNeil et al. | |
| 5,721,435 A | 2/1998 | Troll | |
| 5,889,593 A | 3/1999 | Bareket | |
| 5,912,741 A | 6/1999 | Carter et al. | |
| 5,926,262 A | 7/1999 | Jung et al. | |
| 5,991,022 A | 11/1999 | Buermann et al. | |
| 6,075,612 A | 6/2000 | Mandella et al. | |
| 2001/0001472 A1* | 5/2001 | Sano et al. ............. | 235/462.01 |
| 2002/0080357 A1 | 6/2002 | Dana | |
| 2005/0024049 A1* | 2/2005 | Schutzmann et al. ........ | 324/244 |
| 2005/0056702 A1* | 3/2005 | Robillard .................... | 235/490 |
| 2005/0109850 A1* | 5/2005 | Jones ......................... | 235/487 |

OTHER PUBLICATIONS

K. J. Dana and J. Wang, "Device for Convenient Measurement of Spatially Varying Bidirectional Reflectance," J. Opt. Soc. Am. A, vol. 21, No. 1, Jan. 2004, pp. 1-12.

(Continued)

*Primary Examiner*—Ahshik Kim
(74) *Attorney, Agent, or Firm*—Fox Rothschild LLP

(57) ABSTRACT

A method and apparatus for creating and detecting an optically encoded document having a uniquely designed document verification indicator is disclosed. One embodiment includes applying a spatially varying Brewster angle pattern on a substrate. Another embodiment includes an apparatus for detecting the spatially varying Brewster angle pattern including a light source, a slit aperture, a polarizer, at least one parabolic mirror, and an image capturing device.

15 Claims, 7 Drawing Sheets

OTHER PUBLICATIONS

S. K. Nayar, "Catadioptric Omnidirectional Camera," CVPR '97: Proceedings of the 1997 Conference on Computer Vision and Pattern Recognition (CVPR '97), ISBN 0-8186-7822-4.

K. J. Dana, "BRDF/BTF Measurement Device," International Conference on Computer Vision, Vancouver, BC, Canada, Jul. 2001, pp. 460-466.

* cited by examiner

US 7,699,236 B2

METHOD AND APPARATUS FOR MAKING AND DETECTING A DOCUMENT VERIFICATION INDICATOR USING OPTICAL PATTERN ENCRYPTION

CROSS-REFERENCE TO RELATED APPLICATIONS

This application claims the benefit of U.S. provisional application Ser. No. 60/565,818, entitled Advanced Watermarking Using Optical Pattern Encryption, filed Apr. 28, 2004 and is related to co-pending, commonly assigned U.S. patent application Ser. No. 09/992,486, entitled "Apparatus and Method for Measuring Spatially Varying Bi-Directional Reflectance Distribution Function," filed Nov. 14, 2001, the entire contents of which are incorporated herein by reference.

BACKGROUND OF THE INVENTION

1. Field of the Invention

Embodiments of the present invention generally relate to making and detecting document verification indicators and, in particular, to optically encoding documents with spatially varying refractive index patterned indicators and detecting the patterned indicators using a bi-directional image capturing system.

2. Description of the Related Art

Physical watermarks or watermarking in the form of watermark labels and raised seals have long been used as a means to identify and authenticate documents. These identifying marks can be easily reproduced, however, so they offer little protection against most attempts at producing a fraudulent document. Making physical document verification robust and reliable is of great importance these days, especially in view of our nation's heightened security needs and the increased requirement for accurate identification.

Known systems have attempted to overcome the inherent issues with the aforementioned physical watermarking techniques. For example, known methods use markings outside the visible spectrum. In one example, there is a method of applying a watermark visible only with an infrared detector. In another example, there includes invisible ink applied to a document where the invisible ink is only detectable using an invisible ink detection system. However, these methods are only a small advancement over visible watermarks and minimal sophistication is needed to compromise the integrity of these "invisible" watermarks through the use of inexpensive and readily available infrared cameras, and the like.

In other known watermarking methods, holograms, intaglio printing, and zero-order micro-gratings have been used for document security. These techniques may be more difficult to copy than simple scanning but the patterns are visible by the unaided eye and can be duplicated with known image capturing systems and techniques.

Thus, there is a need for the ability to produce a secure, identifiable document verification indicator, such as a watermark, undetectable by the unaided eye, conventional detection systems such as infrared detection systems, and the like. There is also a need for a document verification indicator system that can include unique information in the patterned indicator to further verify, through the use of a detection system, that the document is authentic.

SUMMARY OF THE INVENTION

Embodiments of the present invention generally relate to a method and apparatus for making and detecting a document verification indicator. In one embodiment, a spatially varying, multi-angle pattern is applied to a document and is detectable under a combination of multiple viewing/illumination directions. In another embodiment, the pattern is transparent and not detectable by an infrared detection system but rather a novel bi-directional detection system.

In accordance with an embodiment, there is provided a document verification indicator comprising an optical pattern of spatially varying refractive index value pixels.

In accordance with another embodiment, there is provided a bi-directional image capturing system for detecting a spatially varying refractive index pattern of pixels applied to a substrate, comprising a light source directed along an optical path for illuminating the pattern being imaged and detected; a slit aperture, positioned to receive light from the light source and to illuminate a set of angles one azimuth at a time in a range of angles to ensure one illumination direction is measured for each position; a polarizer, positioned to receive filtered light from the slit aperture and to polarize the received light; a first concave parabolic mirror having an optical axis disposed parallel to the optical path, positioned to intercept the polarized light from the polarizer and to focus the intercepted polarized light to form an incident ray that strikes the pattern at a selected angle of incidence; a second concave parabolic mirror for intercepting the light that reflects from the pattern at any angle $\theta$ and directing it into a second optical path; and an image capturing device for receiving the light from the second optical path.

In accordance with another embodiment, there is provided a method of detecting a document verification indicator, comprising providing a document with a detectable spatially varying Brewster angle pattern applied thereon; directing a beam of substantially collimated light along an optical path to a first concave parabolic mirror; receiving the beam of light by the first concave parabolic mirror; focusing the intercepted polarized light by the first concave parabolic mirror to form an incident ray that strikes the pattern at a selected angle of incidence; intercepting the light that reflects from the pattern at any angle $\theta$ by a second parabolic mirror; directing the intercepted reflected light into a second optical path; and capturing the reflected light of the second optical path on an image capturing device for detecting the spatially varying Brewster angle pattern.

BRIEF DESCRIPTION OF THE DRAWINGS

So the manner in which the above recited features of the present invention can be understood in detail, a more particular description of the present invention, briefly summarized above, may be had by reference to embodiments, some of which are illustrated in the appended drawings. It is to be noted; however, the appended drawings illustrate only typical embodiments of the present invention and are therefore not to be considered limiting of its scope, for the present invention may admit to other equally effective embodiments.

Figure 1:
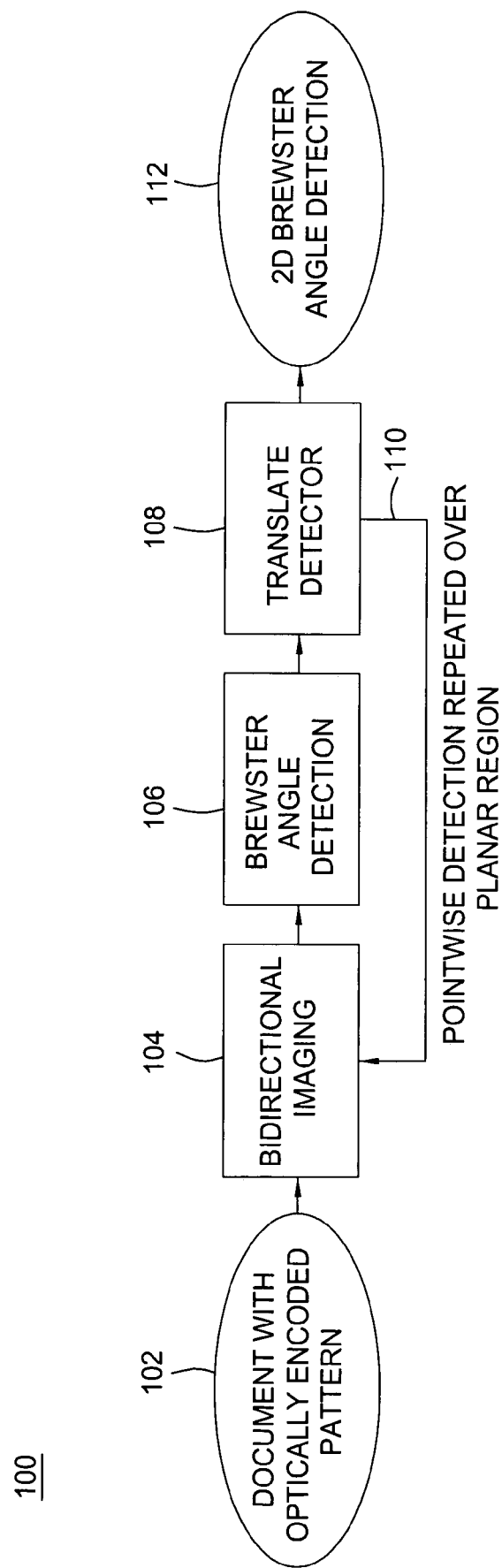
FIG. 1 is a functional block diagram of a system for providing a document verification indicator and detecting that indicator in accordance with an embodiment of the present invention.

While embodiments of the present invention are described herein by way of example using several illustrative drawings, those skilled in the art will recognize the present invention is not limited to the embodiments or drawings described. It should be understood the drawings and the detailed description thereto are not intended to limit the present invention to the particular form disclosed, but to the contrary, the present invention is to cover all modifications, equivalents and alternatives falling within the spirit and scope of embodiments of the present invention as defined by the appended claims.

The headings used herein are for organizational purposes only and are not meant to be used to limit the scope of the description or the claims. As used throughout this application, the word "can" is used in a permissive sense (i.e., meaning having the potential to), rather than the mandatory sense (i.e., meaning must). Similarly, the words "include," "including," and "includes" mean including, but not limited to. To facilitate understanding, like reference numerals have been used, where possible, to designate like elements common to the figures.

DETAILED DESCRIPTION

Embodiments of the present invention comprise optically encoded patterns with uniquely designed document verification indicators to be applied to documents and a novel bi-directional detection system for detecting same. Whereas certain known document verification indicators may be visible under one viewing direction or angle, for example, when a document is tilted with respect to the observer, in one embodiment of the present invention, each pixel on a document verification indicator is visible under a different viewing direction or angle, making the optically encoded pattern incapable of being viewed simultaneously by an unaided eye or by any known image capturing device or detector. Thus, the document verification indicator produced in accordance with an embodiment of the present invention is substantially difficult to duplicate and the detection process is not easily inferred. Therefore, fraudulent or unauthorized duplication of documents are readily identifiable.

FIG. 1 illustrates generally a system 100 in accordance with an embodiment of the present invention comprising the making and detection of spatially varying optically encoded patterns as document verification indicators using a bi-directional image capturing detector. As a first stage in the system 100, a document is optically encrypted with an optically encoded pattern 102. The pattern 102 is concealed from a person viewing the document with an unaided eye.

Specifically, in one embodiment, the pattern consists of a spatially varying application of thin film optical material, each portion of which differs by a change in its refractive index. The pattern may be made by applying layers of different refractive indexes onto a document. The pattern may also be made using templates or stencils. The applying step may be through chemical vapor deposition, ink jet printing, and the like. Alternatively, micro-mirrors may be applied to a document. In this embodiment, micro-mirrors exhibiting varying angles of reflection would be applied to a document to achieve a similar result as the thin film embodiment. In this embodiment, instead of detecting the Brewster angle, an image capturing device would process the specular reflections.

At stage 104, a bi-directional optical device in accordance with an embodiment of the present invention performs bi-directional image capturing of the document to obtain an image of the optically encoded pattern on the document 102. The imager substantially simultaneously scans the encoded pattern with multiple illumination directions. That is, the detection system illuminates the pattern 102 on the document at a set of angles. The illumination is performed with polarized light. Additional features of this process are discussed herein.

The reflected intensities (as a function of incident angle) are analyzed at stage 106 in order to detect Brewster angles of the thin transparent film or layer having an optically encoded pattern thereon. That is, the pattern on the document 102 is detected at a set of angles. The Brewster angles depend on the refractive index of each pixel of the pattern on the document. Then, at 108, parabolic mirrors of the detector system are translated to a neighboring surface point. This process is repeated a sufficient number of times to create a 2D grid or planar region through a an iterative path 110 for image capturing by an image capturing device (discussed herein). In an alternative embodiment, a single parabolic mirror of sufficient size to accommodate the angle of incidence by about 50 to 60 degrees may be used instead of the two parabolic mirrors.

The resulting captured image 112 is a 2D image of a Brewster angle pattern of pixels that may comprise a code used for authentication of the document under examination. Specifically, as the refractive index changes across the scanned document, the Brewster angle, which can be detected because it is the darkest point (i.e., minimum reflection of light), changes with the changing refractive index values. Alternatively, the mere existence of a spatially varying pattern as described herein that is detectable will serve as an authentication means. A more detailed discussion of each of these stages is discussed in connection with the remaining figures herein below.

As discussed above, embodiments of the present invention utilize optical reflection and transmission properties near the Brewster angle to create and detect a unique pattern. That is, the Brewster angle is used for characterizing the optical pattern appearance. Similar to Brewster Angle Microscopy (BAM), this technique allows the direct observation of ultra thin organic films on transparent dielectric substrates. It is based on the effect that no reflection occurs from a flat interface when the incident light is polarized parallel to the plane of incidence and the angle of incidence equals the Brewster angle. The transparent substrate, illuminated under the substrate's Brewster angle, appears as a black background. In the area where the thin film (of different refractive index) covers the substrate, reflected light will be present, which allows detection 106 of the thin film. Layers as thin as about 2 nm are sufficient to cause a reflection.

In BAM, the Brewster angle of the substrate is known and the illumination angle is fixed to this known Brewster angle. The thin film is visible because its Brewster angle differs from that of the substrate and therefore it reflects light to a sensor. In embodiments of the present invention, however, the actual Brewster angle of the thin film pattern is not known and must be detected. This detection 106 is possible because the novel bi-directional image capturing device illuminates and views a large range of angles substantially simultaneously.

Because, in accordance with embodiments of the present invention, the Brewster angle is not fixed, the Brewster angle spatial variation pattern 102 can be made unique to a pattern so that information can be communicated and changed at will during the pattern application process. For document verification purposes, for example, the end-user could verify documents are authentic by reading and verifying a code that is unique to that individual. Details of this coding process are discussed with respect to FIGS. 4A, B and C.

An advantage to using bi-directional imaging 104, in accordance with an embodiment of the present invention, is the surface normal of the document need not be known precisely. A large range of viewing angles are measured so it is not necessary to know the surface normal a priori. Instead, the resulting 2D reflection pattern 112 reveals the global surface normal. This technique provides for document verification indicators being detectable in real-world, non-lab conditions.

Figure 2A:
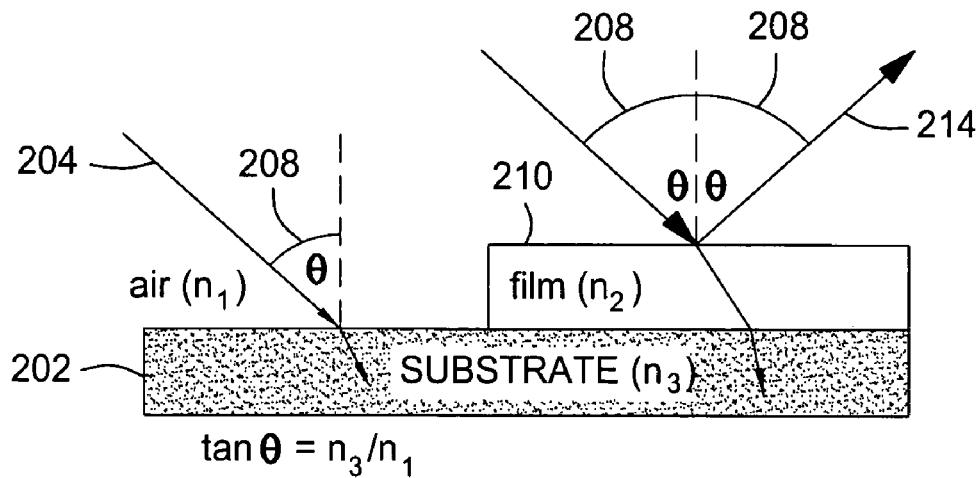
FIG. 2A is a cross sectional schematic view illustrating a portion of an optical pattern in accordance with an embodiment of the present invention.
Figure 2B:
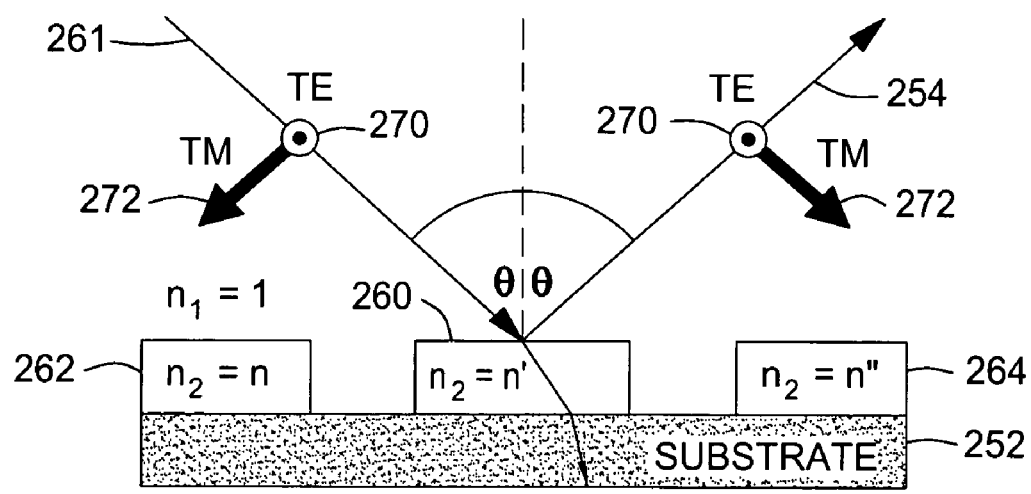
FIG. 2B is a cross sectional schematic view illustrating a portion of another optical pattern in accordance with an embodiment of the present invention.

FIGS. 2A and 2B illustrate substrates produced from Brewster angle-based optical methods of making an optical encryption or spatially varying Brewster angle pattern on a document in accordance with embodiments of the present invention. As shown in FIG. 2A, in accordance with one embodiment, the pattern consists of a planar grid 200 of reflecting pattern elements (i.e., pixels) made of thin layers of transparent optical materials with different indices of refraction (n). Throughout this specification, the term "pattern pixels" or simply "pixels" is used when referring to these pattern elements as an analogy to discrete picture elements in image processing. When light is incident at angle θ (208) on the flat surface of the pixels (FIG. 2A), it is reflected at the same angle by all the pattern pixels. The amount of light reflected by each element, however, depends on the polarization of the incident light and the refractive index of the material from which each element is made.

By appropriately choosing the pixel materials and the polarization of the incident light, the amount of light reflected by certain pixels can be made zero when viewed under certain angles. In this way, a pattern of light and dark pixels are created, visible only in polarized light under a particular combination of angles. Thus, the pattern is detectable only with the use of the bi-directional image device described herein in one embodiment of the present invention.

Furthermore, FIG. 2A illustrates a simple pattern of the above described Brewster angle-based optical method. When polarized light 204 is incident at the Brewster angle θ (208) corresponding to the substrate of the refractive index $n_3$ (202), the reflection illumination is substantially equal to zero, resulting in a substantially black background being received by the image capturing detector. The sample film having a refractive index $n_2$ (210) has a corresponding different Brewster angle, so its reflection at an angle θ (208) is a value other than zero, producing an illuminated ray of light 214, which is receivable by the image capturing detector. In this way, thin transparent films can be made visible and detectable on such substrates.

FIG. 2B depicts a cross sectional view of a Brewster angle encoded pattern in connection with a plurality of pixels having varying indices of refraction. The pattern 250 is made of pixels (e.g., squares, rectangles or any other shape capable of making an overall detectable pattern) of thin films with different refractive indices. These thin films are applied to the top of the substrate 252 having an index of refraction similar to the substrate in FIG. 2A. A plane wave 261 incident at an angle at the interface between air ($n_1$=1) and the pattern of thin film ($n_2$=n,n',n") (262, 260 and 264) includes a transverse electric (TE) polarization 270 (perpendicular to the plane of incidence) or transverse magnetic (TM) polarization 272 (parallel to the plane of incidence).

In an embodiment of the present invention, the TM polarization 272 is used, whose reflection approaches zero at the Brewster angle. Pixels in the pattern will appear dark (zero reflection) at the Brewster angles corresponding to their respective indices of refraction. The spatially varying pattern can be encoded by choosing a certain spatial distribution of the indices of refraction and therefore a spatial distribution of Brewster angles. By viewing several angles at the same time, several squares (or rectangles or other shape) will appear dark at the same time, allowing the coding and decoding of a unique, predetermined pattern. Encoding the pattern pixels incorporates the Brewster angle reflection.

The thin layers of spatially varying Brewster angle patterns may be applied or deposited, printed, layered, painted or otherwise applied to the substrate 252 in any known manner, such known methods being contemplated by embodiments of the present invention. For example, the pattern may be applied using known ink jet printing techniques.

Figure 3A:
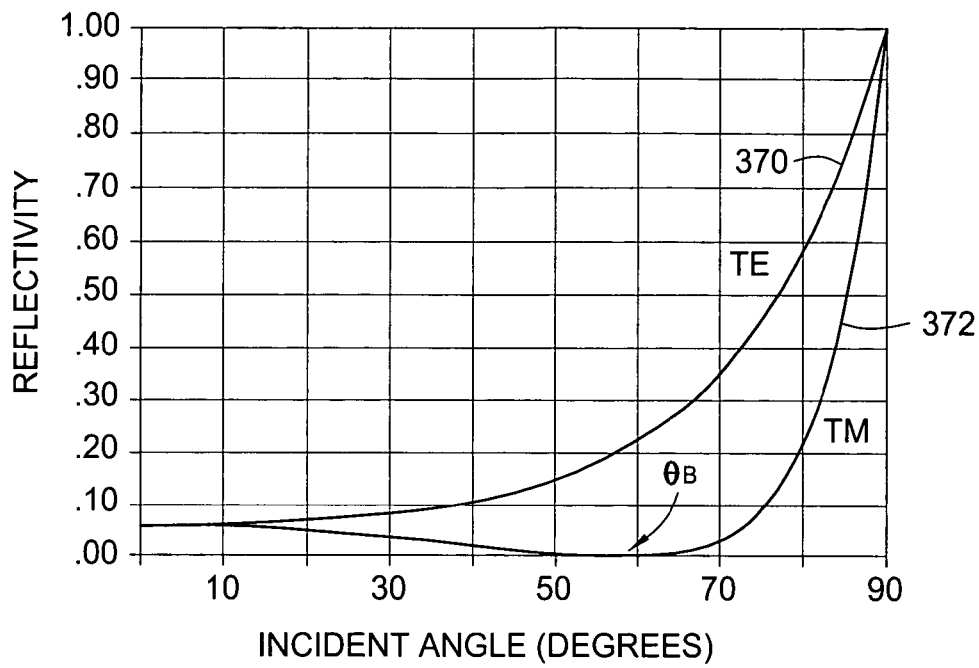
FIG. 3A is a graph depicting the ratio between reflectivity and incident angle (in degrees) for two types of polarizations.

FIG. 3A illustrates the ratio between reflected and incident optical powers (reflectivity) for the two types of polarization: TE (370) and TM (372). Here, under TE polarization 270, the electric field is perpendicular to the plane of incidence, and under TM polarization 272, the magnetic field is perpendicular to the plane of incidence. Thus, when using TM polarization, the electric field is parallel to the plane of incidence.

If R (θ) denotes the reflectivity in the direction of −θ as a function of incidence angle θ, for both polarizations, the reflectivity R increases from its normal incident value $$R(0)=[(n-1)/(n+1)]^2 \quad (1)$$

$$R(\Pi/2)=1 \quad (2)$$

at grazing incidence. For the TM polarization, however, the reflectivity becomes zero at the Brewster angle $\theta_B$ which is given by:

$$\theta_B = \tan^{-1}(n) \quad (3)$$

Thus, when TM (or "parallel") polarized light is used, a pattern pixel illuminated under the Brewster angle appears dark. The Brewster angle and the angular dependence of the reflectivity are determined by the index of refraction, which is characteristic of the optical material of which the pixel is made.

Figure 3B:
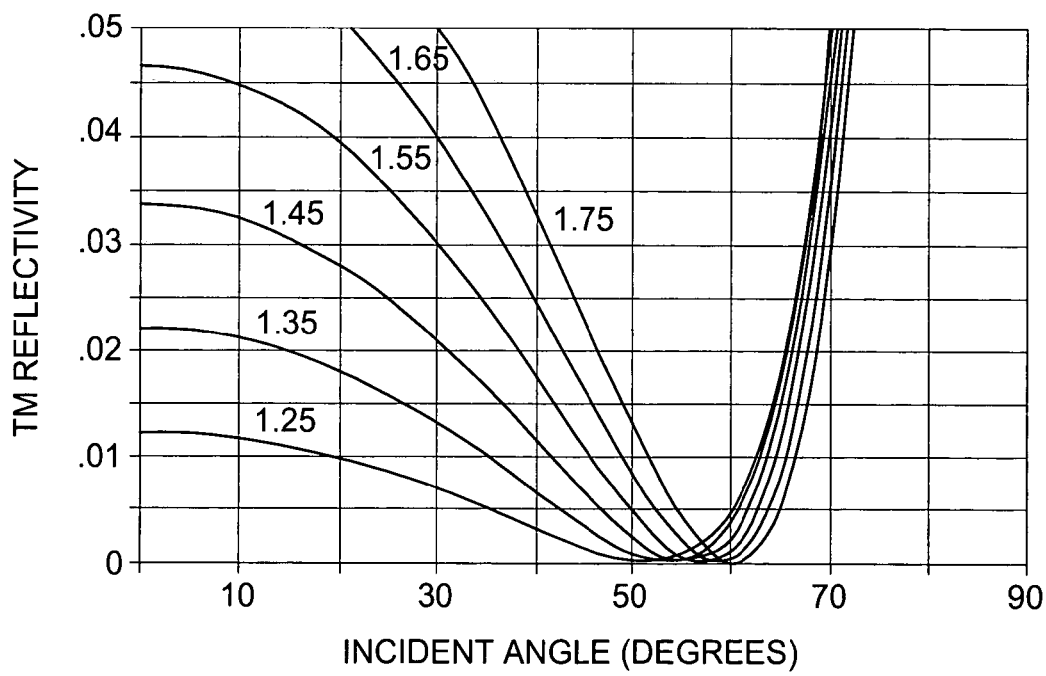
FIG. 3B is a graph depicting the angular dependence of reflectivity and the value of the Brewster angle determined by the refractive index.

FIG. 3B illustrates the angular dependence of the TM reflectivity for values of the refractive index typical of optically transparent materials. As shown, the Brewster angle increases for increasing refractive index. The shape of the reflectivity curve in the vicinity of the reflectivity minimum is also strongly dependent upon the value of the refractive index. For a given angle of incidence, for example 10°, the reflectivity can increase by a factor of four when the refractive index changes between 1.25 and 1.55.

Embodiments of the present invention utilize these properties of the Brewster angle to create a pattern of spatially dependant reflectivity, which can be detected by the embodiment of the bi-directional imager discussed herein. In one embodiment, the pattern consists of a plane or grid of reflecting pattern elements, made of thin layers of optical materials with different indices of refraction. Alternatively, when TM polarized light is used, pattern pixels illuminated at the Brewster angle will appear dark. Because different pixels have different indices of refraction, they have different Brewster angles and appear "dark" at different illumination angles as detailed in FIGS. 4A-4C.

Figure 4A:
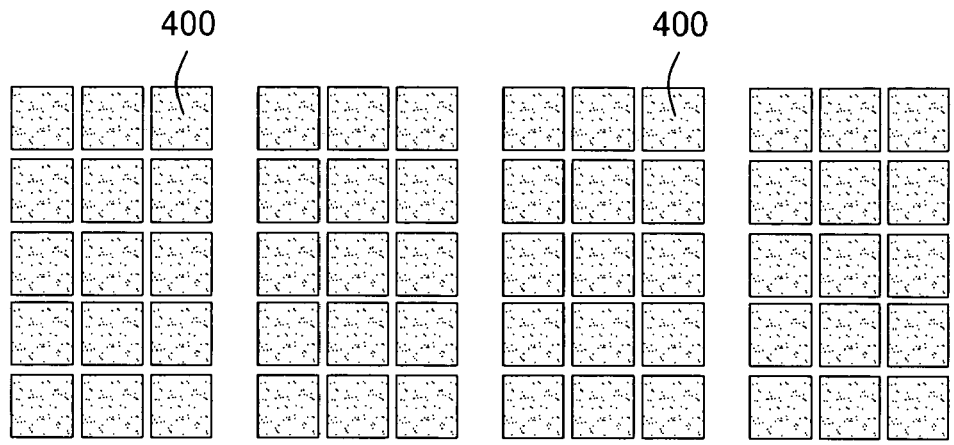
FIG. 4A depicts a document verification indicator made in accordance with an embodiment of the present invention, where such indicator is viewed with an unaided eye (or an infrared detector) at an angle θ.
Figure 4B:
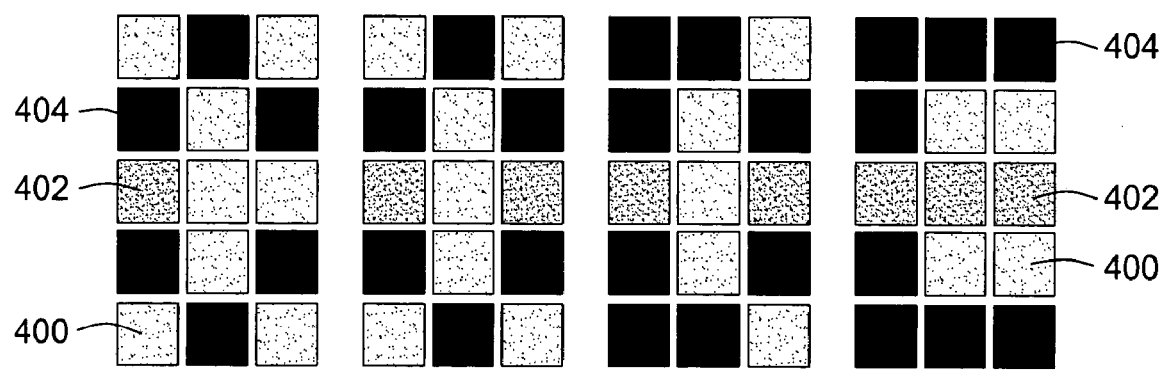
FIG. 4B is the same indicator of FIG. 4A, viewed with polarized light at an angle θ.

FIGS. 4A, B and C comprise pixels made of four different materials having different indices of refraction. FIG. 4A depicts an image when viewed by an unaided eye in unpolarized light. In this arrangement, the pixels 400 will appear substantially identical, completely hiding the encoded pattern. FIG. 4B depicts the pattern in a correctly polarized manner. In this arrangement, only a subset 404 of the pattern pixels may appear dark at any particular viewing angle. This also does not expose the correct encoding pattern.

Figure 4C:
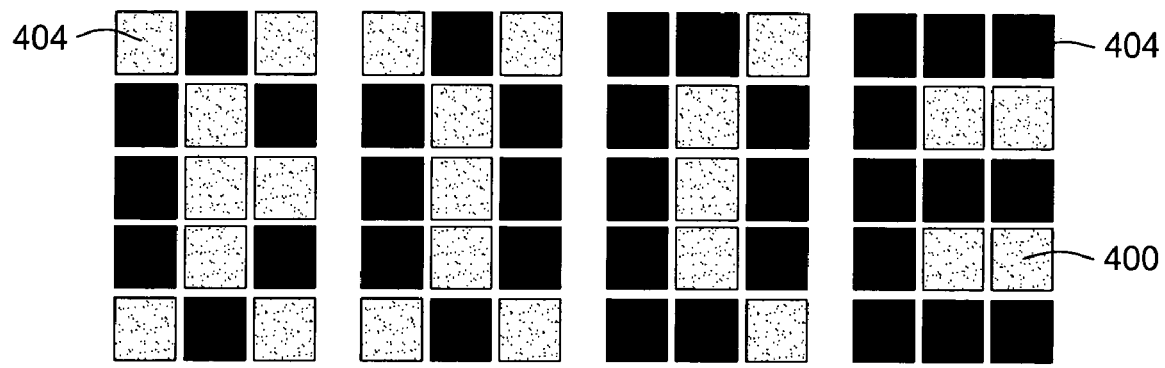
FIG. 4C is the same indicator of FIG. 4A, viewed with a novel bi-directional imaging system in accordance with an embodiment of present invention.

FIG. 4C, on the other hand, depicts a pattern viewed with a bi-directional image capturing device in accordance with an embodiment of the present invention. With this view, the pattern from multiple angles is detectable and the correct and complete pattern is decoded. That is, the way the complete and correct pattern can be decoded is by substantially simultaneously viewing multiple angles with the bi-directional image capturing detector discussed herein. The pattern is a combination among the Brewster angles for three of the four refractive indices $n_1$, $n_2$, $n_3$. In this embodiment, as merely one example, the pattern is decoded to reveal the word "CODE". Therefore, not only is the pattern used as an indicator, e.g., a watermark, but it may include an embedded code word, access code, trademark or other symbol to further verify authenticity.

To make the spatially varying Brewster angle pattern, it is desirable to use a number of different optical materials for the different pixels, to achieve different Brewster angles. The material used to make a pattern is deposited on a document in a reliable and inexpensive manner. One embodiment includes deposition based on versatile ink-jet technology, whose most recent applications include "writing" of refractive microlenses and optical wave guides. In addition to optical polymers, materials dispensed with this technology include solders, thermo space plastics, light emitting polymers, biologically active fluids (such as DNA and proteins), and precursors for chemical synthesis. One source of printing the patterns using ink jet processes is available from MICROFAB Technologies, a company specializing in ink-jet printing and in manufacturing ink-jet printers customized to various applications.

The pattern illustrated in FIG. 4C is merely one embodiment of the present invention. It is based on Brewster angles and coding. However, alternatively simpler and more complicated patterns are contemplated by the present invention. For example, levels of gray can be detected by the bi-directional image capturing device and used in encoding. The reflectivity near the Brewster angle is very low, on the order of a few percent. Therefore, a relatively sensitive detector system is employed in the bi-directional image capturing device to detect the dark and gray pixels. Conversely, the low reflectivity insures that accidental detection of the encoded pattern by the unaided eye or regular detectors is very difficult and nearly impossible.

Figure 5:
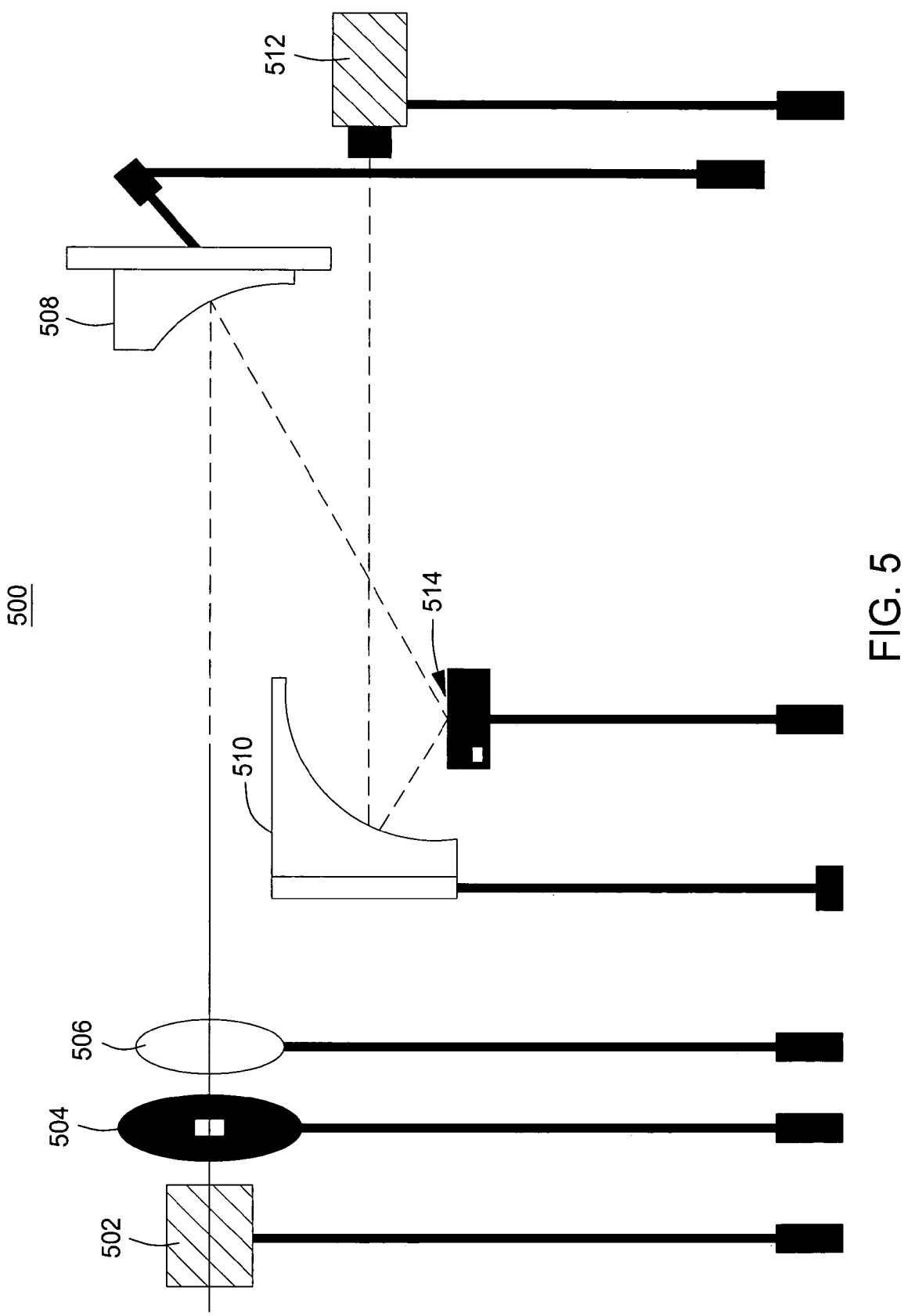
FIG. 5 is a schematic view of a system for detecting a spatially varying Brewster angle pattern in accordance with an embodiment of the present invention.

FIG. 5 depicts a bi-directional image capturing detection system 500 in accordance with an embodiment of the present invention. The detection or measurement system 500 comprises a light source 502, a slit aperture 504, a polarizer 506, a first parabolic mirror 508, a second parabolic mirror 510, an image capturing device 512, and a surface point 514 for receiving a document having a detectable verification indicator in accordance with an embodiment of the present invention.

The light source 502 or illumination source is a collimated beam of light parallel to the global plane of the surface and passing through the movable slit aperture 504. The light source may alternatively be a laser beam. The slit aperture 504 illuminates a set of angles one azimuth at a time in a range of angles to ensure only a spot of the first concave parabolic mirror 508 is illuminated and therefore one illumination direction is measured for each position.

The first mirror 508 is illuminated with polarized light from the slit aperture 504. Then, the illuminating light will be reflected at the same angle onto the second mirror 510. Thus, for every incidence angle, there is a corresponding angle of reflectance received by the second mirror 510. That reflectance is received by the image capturing device 512. In this approach, changing the illumination direction over a hemisphere is transformed to an easier problem of translating in a plane. An alternative to using a slit aperture 504 is to have a movable light source. In this embodiment, the light source would be moved in a vertical path ever so slightly so as to capture the various indices of refraction from the substrate.

The light reflected at each angle is reflected from the first mirror 508 to a parallel direction and diverted by the second parabolic mirror 510 to the image capturing device 512. Other geometrically shaped reflectors (e.g., mirrors) are contemplated by embodiments of the present invention. However, parabolic mirrors are advantageous in this embodiment as their position can be changed during an imaging session. This is so because parabolic mirrors depend upon parallel light rather than light that is focused on a particular point as would be the case with an elliptical mirror. Therefore, it is not critical where the parabolic mirror is positioned or adjusted as long as it stays within the field of parallel light incident on the surface point 514. Furthermore, it is contemplated by the present invention to have an embodiment of the system 500 where only one parabolic mirror is employed. This mirror would in one embodiment be in a position to receive the polarized light from the slit aperture 504 and be capable of reflecting it into the image capturing device 512, discussed below. The one parabolic mirror would need to be long enough to have an angle of incidence by about 50 to 60 degrees.

The image capturing device 512, which may comprise a CCD camera, may be equipped with an orthographic or telecentric lens that images the light parallel to the optical axis. The image from the second concave parabolic mirror 510 is viewed by the image capturing device 512, which is positioned so its optical axis lies along the y-axis such that a single image corresponds to reflect its measurements at all angles in a partial hemisphere from a single surface point 514. To obtain a measurement of a surface patch for spatially varying reflectance, the second concave parabolic mirror 510 may be translated along the X-Y plane. By choosing a particular viewing direction, $\theta_v$, $\phi_v$ (which corresponds to choosing a particular pixel from the camera image), the measured intensities can be re-assembled into an image of the surface from that chosen viewing direction. Concave mirror 508 is positioned so its focus is coincident with the surface point 514 to be measured.

The system 500 is adapted for reading optically encoded patterns, where the optical code is a spatially varying Brewster angle pattern in accordance with an embodiment of the present invention. As previously discussed, the system 500 is based on bi-directional imaging. Specifically, at least one curved mirror is employed to obtain multiple views of a single image point. The optical system is arranged so each point on the mirror can be considered a detector sensing light from the same surface point, not from an angle that depends on the mirror position.

As mentioned above, there is a corresponding angle of reflectance received by the second mirror 510. The light from each angle of reflectance is received by the image capturing device 512. Because of the dependence of intensity with incidence angle, along the bright line generated from the slit aperture 504, the intensity varies. Every pixel in the image corresponds to one angle of excidence. Every angle of excidence is illuminated by a corresponding angle of incidence.

Each point on the mirror senses a different reflection angle. By imaging the entire mirror, a large range of reflectance angles are viewed substantially simultaneously. The same mirror can be used to illuminate the surface point at a chosen angle by using the slit aperture 504. Thus, because both the angle of incidence and the viewing angle are controllable, the optical detector is called a bi-directional imager.

Figure 6:
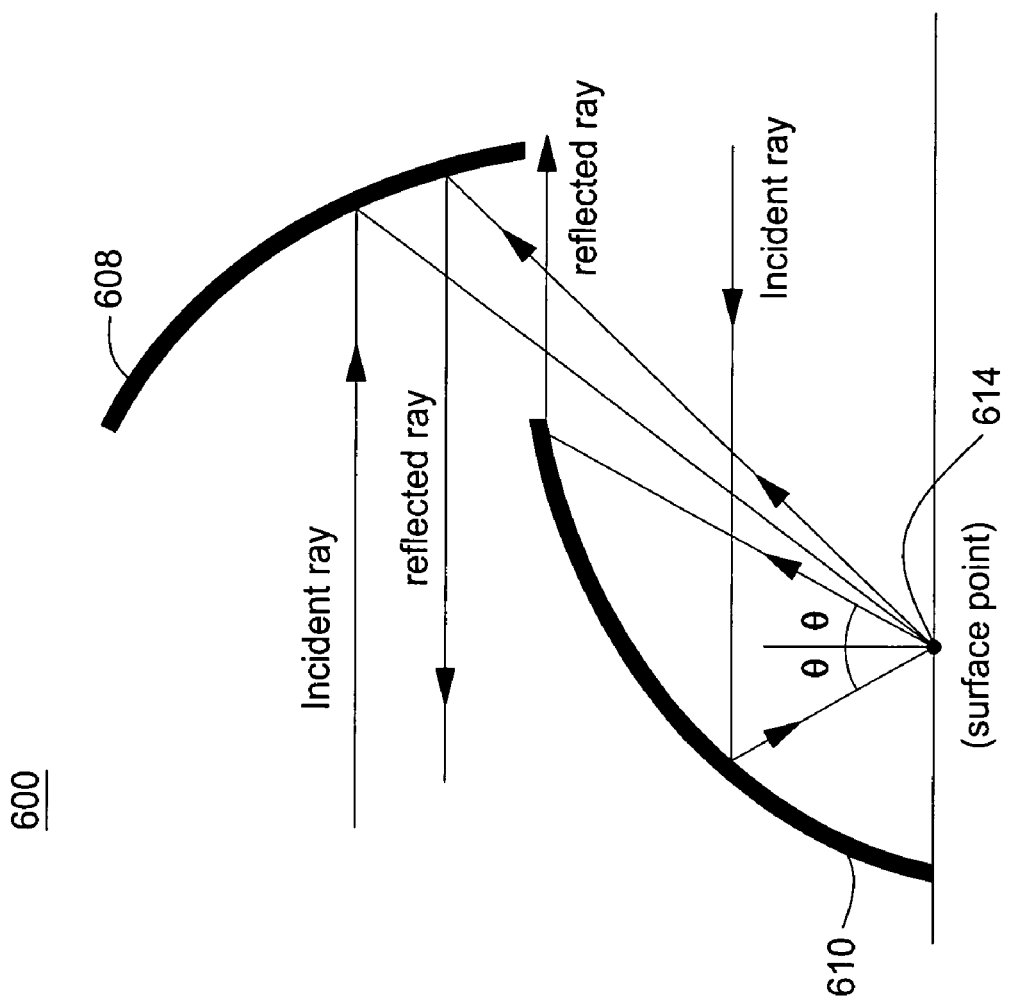
FIG. 6 illustrates a cross section of the two parabolic mirror configurations from the system of FIG. 5 in accordance with an embodiment of the present invention.

FIG. 6 depicts the two-mirror configuration 508 and 510 from the system 500 described in FIG. 5. The two-mirror configuration 600 comprises a first concave parabolic mirror 608 and second concave parabolic mirror 610, which extend the range of illumination and detection angles. The focus of the first mirror 608 is coincident with the second 610 so range of angles for the incident and reflected light is increased.

In operation, in accordance with an embodiment, a spatially varying Brewster angle pattern is disposed on a substrate using, for example, the aforementioned method. The Brewster angle is not known during the image capturing process. Therefore, all combinations of illumination and detection need to be tested. This process is performed, in an embodiment, automatically with the bi-directional image capturing system 500. The bi-directional system 500 will detect reflection even when there are deviations from the ideal plane of incidence, ensuring detection of the pattern even when deviations from planarity are significant. Once the Brewster angle variations of the patterns are verified, these are used as starting points for the bi-directional image capturing system 500.

To substantially simultaneously view the specular reflection from multiple excitant angles, the surface point 514 is illuminated with multiple angles. This can be accomplished by moving the slit aperture 504 to change the vertical position of incident light ray as further described in FIGS. 7A and B. However, the majority of the measured reflective light is expected at the specular direction (−θ for an incident angle equal to θ θ), as discussed more fully below. Therefore, multiple rays can be used instead of a single ray, and accordingly, the slit aperture 504 (for an extended source) or a linear array (for a light source).

Because the pattern is deposited directly on a substrate in this embodiment, the reflection from the substrate is important in interpreting the sensor images. The fundamental idea in many reflectance models in vision and graphics is decomposing reflectance into body reflectance and surface reflectance, so that image intensity I can be written $$I = I_{body} + I_{surface} \tag{4}$$

Body reflectance is an encompassing term that covers any light that penetrates the surface, scatters and reflects back to the sensor. Surface reflectance specifically covers the reflectance at the top most interface that does not penetrate into the body of the material. Because body reflectance is typically depolarized, while surface reflectance has the polarization properties of the source, polarizer 506 at the source and the detector 512 can be used to separate these two terms. These principles are deployed and employed to measure the surface reflectance and remove the body reflectance.

Figures 7A, 7B, 7C:
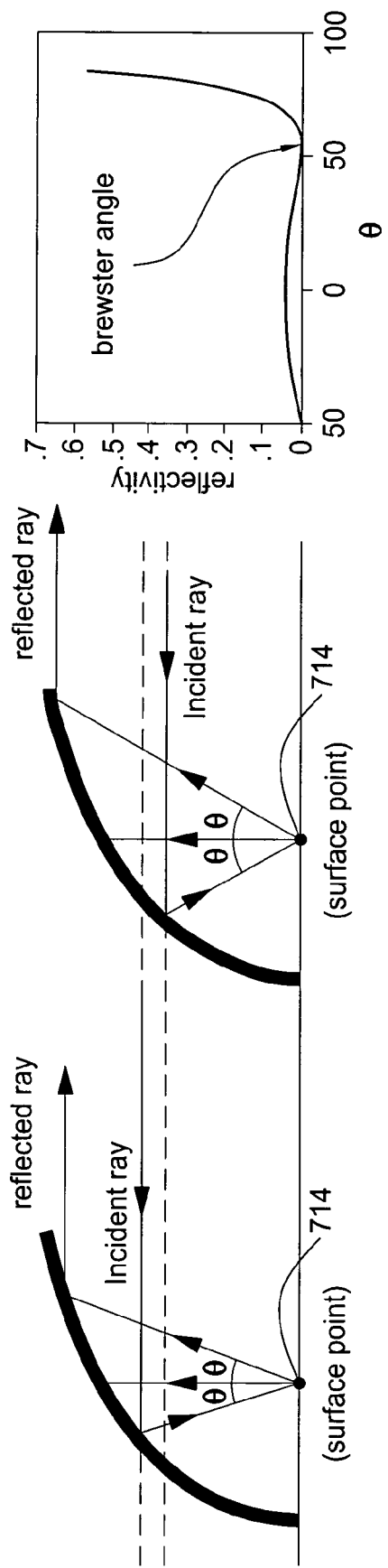
FIGS. 7A-7C illustrate the measuring of incident illumination rays of different illumination angles to determine the Brewster angle for each ray and corresponding pixel in accordance with an embodiment of the present invention.

Turning now to FIGS. 7A and B, the focusing property of a concave parabolic mirror is exploited to simultaneously measure reflected rays. With respect to FIG. 7A, the parabolic mirror 508 is used to direct the incident illumination ray to the sample at any desired angle θ and the reflected ray at angle −θ. This is sensed by the image capturing device 512, in this particular case a CCD camera. Other image capturing devices are contemplated by this invention.

FIG. 7B depicts the parabolic mirror where the incident ray is translated and consequently the angle θ is varied over the range of interest. As shown in FIG. 7C, the Brewster angle is estimated by finding the minimum reflected light as a function of θ θ.

While the foregoing is directed to embodiments of the present invention, other and further embodiments of the present invention may be devised without departing from the basic scope thereof, and the scope thereof is determined by the claims that follow.

The invention claimed is:

1. A bi-directional image capturing system for detecting a spatially varying refractive index pattern applied to a substrate, comprising: a light source directed along an optical path for illuminating the pattern being imaged and detected; a slit aperture, positioned to receive light from the light source and to illuminate a set of angles one azimuth at a time in a range of angles to ensure one illumination direction is measured for each position; a polarizer, positioned to receive filtered light from the slit aperture and to polarize the received light; a first concave parabolic mirror having an optical axis disposed parallel to the optical path, positioned to intercept the polarized light from the polarizer and to focus the intercepted polarized light to form an incident ray that strikes the pattern at a selected angle of incidence; a second concave parabolic mirror for intercepting the light that reflects from the pattern at an angle θ and directing it into a second optical path; and an image capturing device for receiving the light from the second optical path.

2. The system of claim 1, wherein the image capturing device receives images from the second concave parabolic mirror to substantially simultaneously obtain a large range of reflectance angles.

3. The system of claim 1, wherein the slit aperture is moveable.

4. The system of claim 1, wherein the second concave parabolic mirror is moveable.

5. A method of detecting a document verification indicator, comprising: providing a document with a detectable spatially varying Brewster angle pattern applied thereon; directing a beam of substantially collimated light along an optical path to a first concave parabolic mirror; receiving the beam of light by the first concave parabolic mirror; focusing the intercepted polarized light by the first concave parabolic mirror to form an incident ray that strikes the pattern at a selected angle of incidence; using a second parabolic mirror to intercept the light that reflects from the pattern at an angle θ in the range from about 50 to about 60 degrees; directing the intercepted reflected light into a second optical path; and capturing the reflected light of the second optical path on an image capturing device for detecting the spatially varying Brewster angle pattern.

6. The method of claim 5, wherein the method further comprises: detecting point wise slits repeated over a plane or region to bi-directionally image portions of the document; and creating a 2D Brewster angle pattern.

7. The method of claim 6, wherein the detecting step comprises obtaining multiple views of the pattern.

8. The method of claim 6, wherein the bi-directional imaging step comprises controlling the angle of incidence and the viewing angle.

9. The method of claim 5, wherein the method further comprises providing a slit aperture in the optical path, positioned to receive light from the beam of substantially collimated light and illuminating a set of angles one azimuth at a time in a range of angles to ensure one illumination direction is measured for each position.

10. The method of claim 9, wherein the method further comprises providing a polarizer, positioned to receive filtered light from the slit aperture and to polarize the received light.

11. The method of claim 10, wherein the slit aperture is moveable and the method further comprises moving the slit aperture to a first position to direct the beam of substantially collimated light to a first portion of the first concave parabolic mirror. pg,23

12. The method of claim 11, wherein the method further comprises repeating the step of moving the slit aperture N increments, where N is an integer greater than 0, and equal to the number of steps needed to direct the beam of substantially collimated light to substantially every portion of the first concave parabolic mirror.

13. The method of claim 5, further comprising the step of bi-directionally image capturing the pattern to substantially simultaneously determine individual pixel incidence angles.

14. The method of claim 5, wherein the capturing step further comprises detecting the pattern in order to determine if it includes an authentication code.

15. A bi-directional image capturing system for detecting a spatially varying refractive index pattern applied to a substrate, comprising: a light source directed along an optical path for illuminating the pattern being imaged and detected; a slit aperture, positioned to receive light from the light source and to illuminate a set of angles one azimuth at a time in a range of angles to ensure one illumination direction is measured for each position; a polarizer, positioned to receive filtered light from the slit aperture and to polarize the received light; at least one concave parabolic mirror having an optical axis disposed parallel to the optical path, positioned to intercept the polarized light from the polarizer, focus the intercepted polarized light to form an incident ray that strikes the pattern at a selected angle of incidence, intercept the light that reflects from the pattern at any angle $\theta$, and direct the reflected light into a second optical path; and an image capturing device for receiving the light from the second optical path and for detecting the pattern.

\* \* \* \* \*